(12) United States Patent
Gossner

(10) Patent No.: US 9,489,093 B2
(45) Date of Patent: Nov. 8, 2016

(54) CAPACITIVE SENSING APPARATUS AND METHODS

(71) Applicant: Texas Instruments Deutschland GmbH, Freising (DE)

(72) Inventor: Kai Gossner, Neukirchen-Vluyn (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 13 days.

(21) Appl. No.: 14/300,757

(22) Filed: Jun. 10, 2014

(65) Prior Publication Data

US 2015/0022489 A1     Jan. 22, 2015

Related U.S. Application Data

(60) Provisional application No. 61/856,335, filed on Jul. 19, 2013, provisional application No. 61/877,760, filed on Sep. 13, 2013.

(51) Int. Cl.
    *G06F 3/045*      (2006.01)
    *G06F 3/044*      (2006.01)
    *G06F 3/041*      (2006.01)

(52) U.S. Cl.
    CPC ............. *G06F 3/044* (2013.01); *G06F 3/0418* (2013.01)

(58) Field of Classification Search
    CPC ................. G06F 3/044; G06F 3/0418
    USPC ................. 345/173, 174; 178/18.06
    See application file for complete search history.

(56) References Cited

U.S. PATENT DOCUMENTS

| | | | |
|---|---|---|---|
| 2011/0063246 A1* | 3/2011 | Wei .................. | G06F 3/044 345/174 |
| 2011/0125435 A1* | 5/2011 | Naumann ........... | G01R 27/26 702/65 |
| 2013/0120053 A1 | 5/2013 | Mei et al. | |

* cited by examiner

*Primary Examiner* — Jimmy H Nguyen
(74) *Attorney, Agent, or Firm* — Gregory J. Albin; Frank D. Cimino

(57) ABSTRACT

One or more waveform generators impose an input waveform across touch sensor components. Phase shift detection logic measures a phase shift between the input waveform and an output waveform component associated with each waveform generator appearing across a touch sensor component. Amplitude ratio detection logic measures an output-to-input waveform magnitude ratio associated with each waveform generator. Translator logic converts the phase shift(s) and optionally the output-to-input waveform magnitude ratio(s) to capacitance values. Validation logic compares the resulting capacitance values to each other to determine consistency and validity during a particular waveform sampling time. The phase shift detection logic and the amplitude ratio detection logic are optionally implemented with discrete Fourier transform logic which includes narrow-band filtering to exclude electromagnetic interference frequency components from touch sensor signal measurements.

20 Claims, 8 Drawing Sheets ical Field

Structures and methods described herein relate to capacitive touch sensing, including the generation, detection, and processing of capacitive sensor signals to achieve higher signal-to-noise ratios, greater sensitivity, and increased reliability of capacitance measurements in the presence of a background electromagnetic interference field.

BACKGROUND INFORMATION

Capacitive sensors utilize a conductive element and a proximate ground plane or one or more proximate conductive elements separated by a dielectric material to form one or more capacitive touch elements. Each capacitive touch element exhibits a capacitance that can vary according to a proximity of a mass referred to herein as a "dielectric mass." The dielectric mass may be any material proximate to the capacitive touch element which changes the overall dielectric strength of the capacitive touch element. For example, a human finger or other animal digit or body part, a fluid flow, an article of manufacture passing by on an assembly line, a tooth of a rotating gear and the like may all constitute dielectric masses. It is noted that the terms "capacitive sensor" and "capacitive touch sensor" are used interchangeably herein. For purposes of this disclosure, the latter term is not to be construed as requiring physical contact of a human digit with the sensor.

A capacitive sensor may consist of a single capacitive touch element or multiple capacitive touch elements. A single touch element sensor may be used in applications ranging from a simple on/off switch to counting applications and relative measurement of a distance of one or more proximate dielectric masses to the touch element. Touch elements of a multi-element capacitive sensor may be organized into a two-dimensional matrix and used to sense a position of a dielectric mass relative to the multi-element matrix.

Electronic circuitry used to detect, amplify, filter and otherwise process capacitive sensor signals is referred to herein as "capacitive touch detection apparatus." Capacitive touch detection apparatus generates one or more output signals or values as relative or absolute measures of capacitance indicating the proximity of a dielectric mass to the sensor. Capacitive sensors and capacitive touch detection apparatus are traditionally susceptible to electromagnetic interference ("EMI") due to their high impedance characteristics. Such EMI may include power line noise, energy-saving lamp noise, noise from switching power supplies, clock and data line noise, and so forth. Fundamental and harmonic frequencies associated with EMI may overlap frequencies of capacitive sensor signals. Such overlap may cause the capacitive touch detection apparatus to output erroneous values of capacitance and to consequently misinterpret the proximity or position of a dielectric mass to the sensor.

SUMMARY OF THE INVENTION

Figure 1:
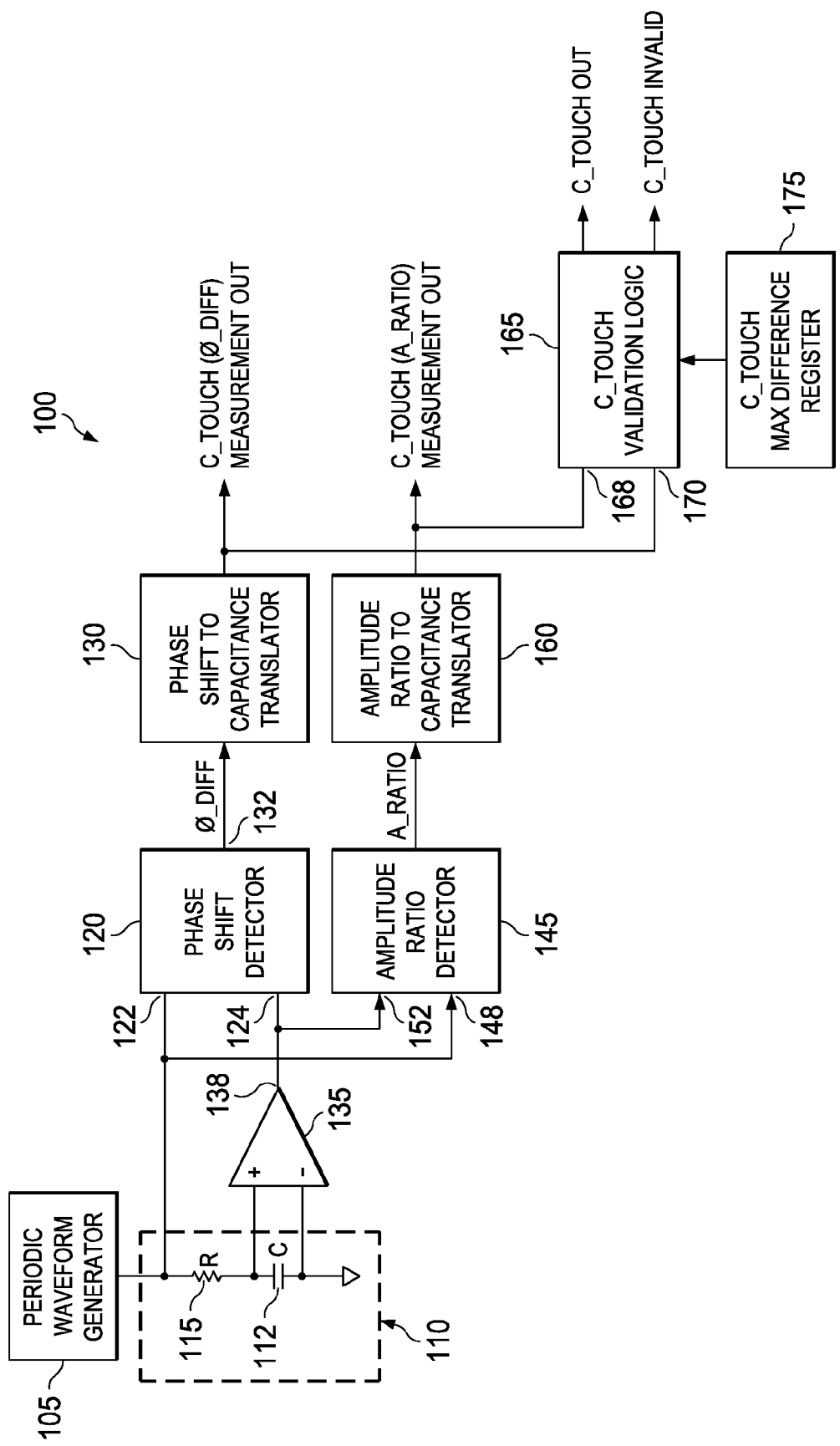
FIG. 1 is a schematic diagram of a capacitive touch detection apparatus according to various example embodiments of the invention.

Apparatus and methods disclosed herein generate one or more periodic input waveforms of frequencies F1, F2 . . . FN and impose the input waveforms across a series-connected resistive-capacitive ("RC") network. The capacitor in the RC network is a capacitive touch element. The RC network causes both a voltage drop and a phase shift of the periodic waveform(s) as measured across either the capacitive touch element or the resistor as output waveform(s). A phase shift detector measures the phase shift between the input and output waveforms. A phase shift to capacitance translator determines the instantaneous capacitance of the capacitive touch element as a function of the phase shift.

In some embodiments, an amplitude ratio detector measures the ratio of the amplitude of the output waveform to the amplitude of the input waveform. An amplitude ratio to capacitance translator determines an additional measure of the instantaneous capacitance of the capacitive touch element as a function of the ratio of the amplitude of the output waveform to the amplitude of the input waveform. In some embodiments, validation logic outputs one or more of the measures of the instantaneous capacitance or generates an average or weighted average of the one or more measures if the difference between the measures does not exceed a specified value. In some embodiments, the validation logic outputs one or more of the measures of the instantaneous capacitance or an average or weighted average of the one or more measures without regard to the difference between the one or more measures.

In some embodiments, the output waveform phase and amplitude are measured by performing analog-to-digital ("ADC") conversions of the output waveform. A sampling clock used to clock the ADC may also be used to synchronize the waveform generator(s) used to generate the periodic input waveforms. A set of output waveform magnitude values sampled from portions of a cycle of a periodic input waveform is acted upon by a discrete Fourier transform ("DFT") logic module associated with a waveform generator of a particular frequency. In some embodiments the DFT is a single-bin DFT ("SB DFT"). DFT embodiments have the advantage of creating a narrow-band filter around the waveform generator frequency and thus excluding previously-discussed EMI frequency components outside of the narrow-band filter. Embodiments including two or more periodic waveform generators, each of a different frequency, may use capacitance values determined from measurements utilizing a waveform generator frequency not subject to unacceptable levels of EMI frequency components at the time of a particular instantaneous touch element capacitance measurement.

Real ("I") and imaginary ("Q") outputs of each DFT logic module are operated on by phase shift logic to determine the instantaneous phase of the output waveform component associated with a waveform generator of a particular frequency. A phase shift calculator determines the phase shift between the input and output waveform components associated with the waveform generator. A phase shift to capacitance translator determines the instantaneous capacitance of the capacitive touch element as a function of the phase shift as described above.

ADC and SB DFT-implemented embodiments may also include amplitude ratio logic to operate on the I and Q DFT outputs to determine the instantaneous amplitude of the output waveform component associated with a waveform generator of a particular frequency. An amplitude ratio calculator determines the ratio of the amplitude of the output waveform component associated with the waveform generator to the amplitude of the input waveform associated with that waveform generator. An amplitude ratio to capacitance translator determines the instantaneous capacitance of the capacitive touch element as a function of the amplitude ratio as described above.

DETAILED DESCRIPTION

FIG. 1 is a schematic diagram of a capacitive touch detection apparatus 100 according to various example embodiments of the invention. The apparatus 100 includes a periodic waveform generator 105 coupled across a series-connected resistive-capacitive ("RC") network 110. The periodic waveform generator 105 generates a periodic voltage waveform of frequency F and imposes the periodic voltage waveform across the RC network 110. The periodic waveform generator 105 may generate a sine waveform, a triangular waveform, a square waveform or a pulse waveform among other waveform shapes.

The RC network 110 includes a capacitive touch element C 112 of variable capacitance C_TOUCH and a resistor R 115. Values of the capacitance parameter C_TOUCH are a function of a proximity of a dielectric mass to C 112, among other factors.

The detection apparatus 100 also includes a phase shift detector 120. A first input 122 of the phase shift detector 120 is coupled across the RC network 110 to receive the periodic voltage waveform. A second input 124 of the phase detector 120 is communicatively coupled across either C 112 or R 115 to receive a decreased magnitude, phase-shifted version of the periodic voltage waveform. The phase shift detector 120 measures a phase shift φ_DIFF between the periodic voltage waveform and the decreased magnitude, phase-shifted version of the periodic voltage waveform. The decreased magnitude, phase-shifted version of the periodic voltage waveform is also referred to herein as "the output waveform." It is noted that the output waveform, although shown in the figures as being sensed across C 112, may alternatively be sensed across R 115.

The detection apparatus 100 further includes a phase shift to capacitance translator 130 coupled to an output 132 of the phase shift detector 120. The phase shift to capacitance translator 130 converts φ_DIFF to a first measure of C_TOUCH as C_TOUCH(φ_DIFF)=(tan φ_DIFF)/(2*π*f*R).

Some embodiments of the detection apparatus 100 also include an amplitude ratio detector 145. A first input 148 of the amplitude ratio detector 145 is coupled across the RC network 110 to receive the periodic voltage waveform. A second input 152 is communicatively coupled across either C 112 or R 115 to receive the decreased magnitude, phase-shifted version of the periodic voltage waveform. The amplitude ratio detector 145 measures an amplitude of the periodic voltage waveform and an amplitude of the decreased magnitude, phase-shifted version of the periodic voltage waveform. From these two amplitude values, the amplitude ratio detector 145 determines a ratio ("A_RATIO") of the amplitude of the decreased magnitude, phase-shifted version of the periodic voltage waveform to the amplitude of the periodic voltage waveform.

Embodiments of the capacitive touch detection apparatus 100 which include the amplitude ratio detector 145 also include an amplitude ratio to capacitance translator 160. The amplitude ratio to capacitance translator 160 is coupled to the amplitude ratio detector 145 to convert A_RATIO to a second measure of C_TOUCH, "C_TOUCH(A_RATIO)". The amplitude ratio to capacitance translator 160 generates the second measure of C_TOUCH as C_TOUCH(A_RATIO)=[(1−A_RATIO2)]1/2/(2*π*f*R*A_RATIO).

In some embodiments, the capacitive touch detection apparatus 100 includes an amplifier 135 input-coupled across either C 112 or R 115, whichever the output waveform measurements are taken from. An output 138 of the amplifier 135 is coupled to one or more of the second input 124 of the phase shift detector 120 and/or the second input 152 of the amplitude ratio detector. The amplifier 135 reduces impedance loading of C 112 or R 115 by the phase shift detector 120, the amplitude ratio detector 145, or both.

Some embodiments of the capacitive touch detection apparatus 100 include C_TOUCH validation logic 165. The C_TOUCH validation logic 165 is coupled to the phase shift to capacitance translator 130 and to the amplitude ratio to capacitance translator 160 via inputs 168 and 170, respectively. The C_TOUCH validation logic 165 receives one or more values of C_TOUCH(φ_DIFF) and/or one or more values of C_TOUCH(A_RATIO). Some embodiments of the C_TOUCH validation logic 165 determine one or more differences between the value(s) of C_TOUCH(φ_DIFF) and the value(s) of C_TOUCH(A_RATIO). The latter embodiments may determine whether the difference(s) are greater than a maximum selected difference ("C_TOUCH_MAX_DIFF"). Such embodiments of the C_TOUCH validation logic 165 may output a value of C_TOUCH termed "C_TOUCH_OUT" as a function of at least one of C_TOUCH(φ_DIFF) or C_TOUCH(A_RATIO) if the difference is less than or equal to C_TOUCH_MAX_DIFF. The latter embodiments may output an invalidity indication if the difference is greater than C_TOUCH_MAX_DIFF. Some embodiments of the capacitive touch detection apparatus 100 may also include a register 175 coupled to the C_TOUCH validation logic 165 to store the value of C_TOUCH_MAX_DIFF.

Figure 2:
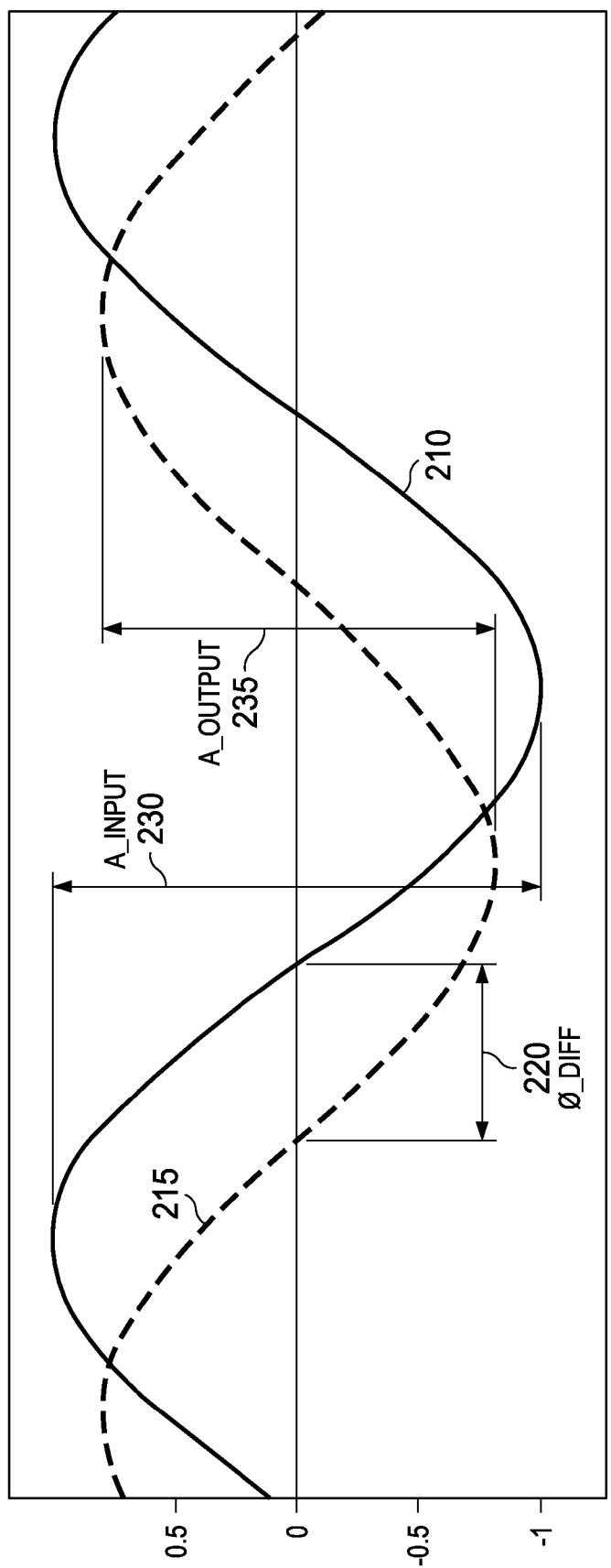
FIG. 2 is a waveform diagram of input and output voltage waveforms associated with a capacitive touch detection apparatus according to various example embodiments.

FIG. 2 is a waveform diagram of an input periodic waveform 210 and a corresponding output periodic waveform 215 as generated by the various example embodiments disclosed herein. The output waveform 215 is a decreased magnitude, phase-shifted version of the input periodic waveform 210. The various embodiments herein measure the phase difference φ_DIFF 220 between the input and output waveforms 210 and 215, respectively. These embodiments determine instantaneous values of the variable capacitance C_TOUCH of a capacitive sensor as a function of φ_DIFF 220.

Some embodiments also measure the magnitudes A_INPUT 230 and A_OUTPUT 235 of the input and output periodic waveforms 210 and 215, respectively. These embodiments determine instantaneous values of the variable capacitance C_TOUCH of a capacitive sensor as a function of a ratio of A_OUTPUT 235 to A_INPUT 230. Although the measures of A_INPUT 230 and A_OUTPUT 235 are shown as peak-to-peak values, some embodiments may measure the magnitudes of the input and output waveforms 210 and 215 as zero-to-peak values or use other magnitude measurement points. As previously mentioned, although the periodic waveforms are shown in the example of FIG. 2 as sine waves, periodic waveforms of any shape may be implemented by the various embodiments, including triangular waveforms, square waveforms, etc.

Figure 3:
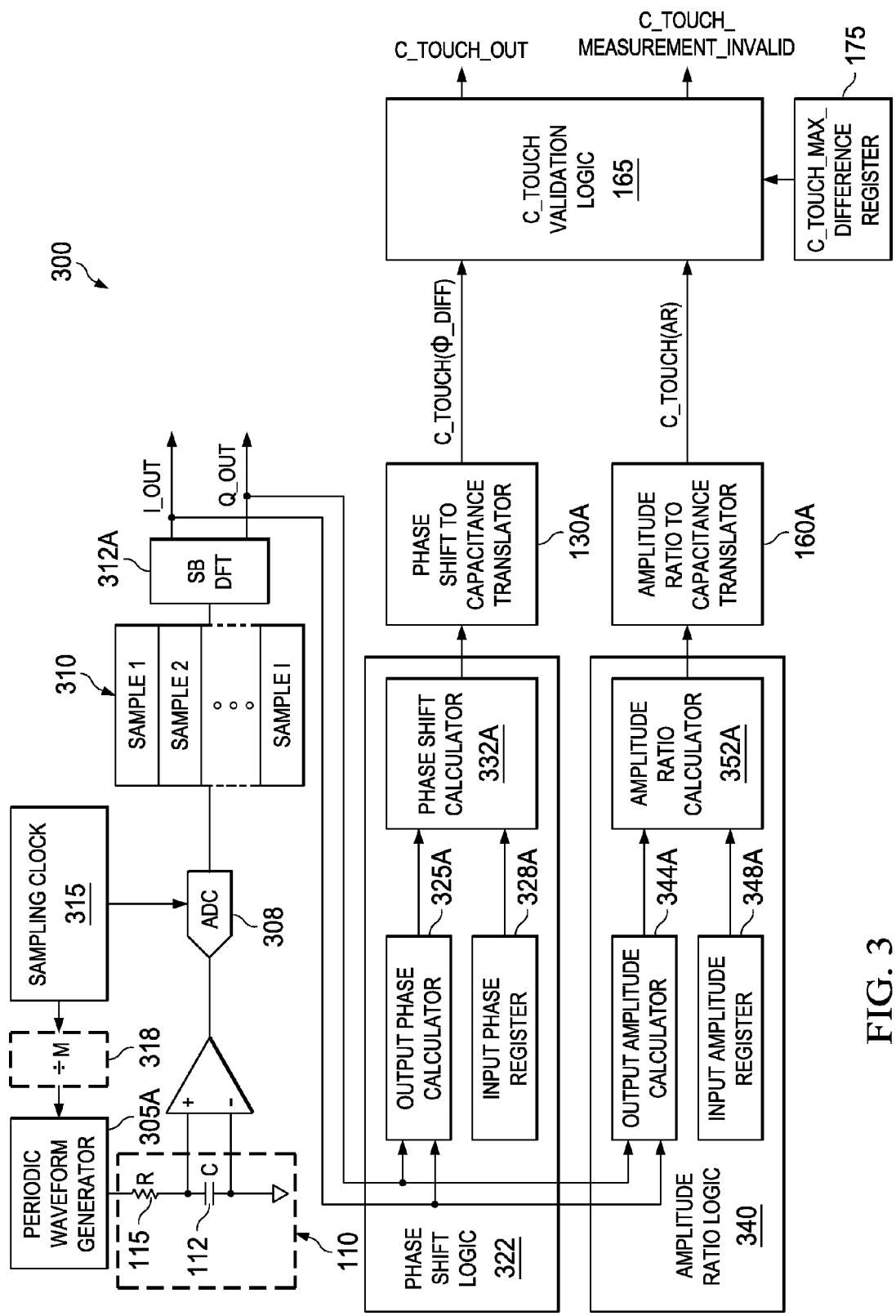
FIG. 3 is a schematic diagram of a capacitive touch detection apparatus according to various example embodiments.
Figure 4:
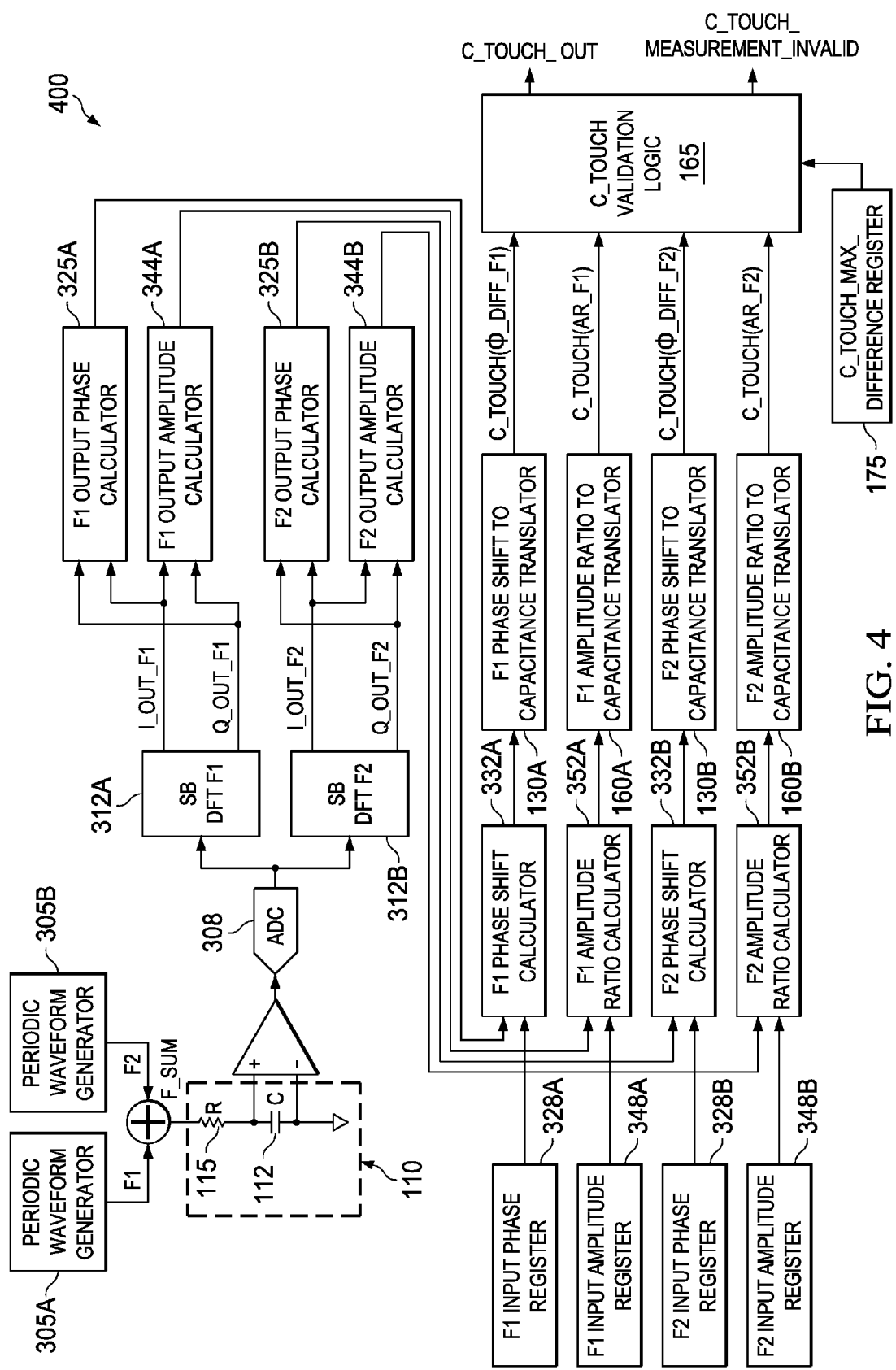
FIG. 4 is a schematic diagram of a capacitive touch detection apparatus according to various example embodiments.

FIGS. 3 and 4 are schematic diagrams of capacitive touch detection apparatus 300 and 400, respectively, according to various example embodiments. The apparatus 300 and 400 will be described together to avoid repetitiveness as they are similar. The apparatus 300 processes touch sensor signals initiated by a single periodic waveform generator 305A. The apparatus 400 performs the same processing techniques as the apparatus 300 on signals initiated by any number N of waveform generators. It is noted, however, that for the sake of clarity FIG. 4 shows circuitry associated with two waveform generators 305A and 305B as representative of circuitry associated with N waveform generators. Thus, the third through Nth copy of schematic diagram elements and/or signal names associated with a number of waveform generators greater than two referred to below are not shown on FIG. 4. The apparatus 300 and 400 will be referred to below either individually as "apparatus 300" and "apparatus 400" or collectively as "apparatus 300/400."

The capacitive touch detection apparatus 300/400 includes one or more periodic waveform generators (e.g., the waveform generators 305A and 305B) coupled across a series-connected RC network 110. The RC network 110 includes a capacitive touch element C 112 of variable capacitance C_TOUCH and a resistor R 115. Values of C_TOUCH are a function of a proximity of a dielectric mass to C 112. Each of the periodic waveform generator(s) 305A, 305B . . . periodic waveform generator N generates a periodic voltage waveform of frequency F1, F2 . . . or FN of a known amplitude ("A_INPUT_F1", "A_INPUT_F2" . . . or "A_INPUT_FN", respectively) and a known phase value ("φ_INPUT_F1", "φ_INPUT_F2" . . . or "φ_INPUT_FN", respectively). A sum ("F_SUM") of the periodic voltage waveforms is imposed across the RC network 110. In the case of the apparatus 300, F_SUM is equivalent to the single input periodic waveform generated by the single waveform generator 305A.

The capacitive touch detection apparatus 300/400 also includes an ADC 308 communicatively coupled across either C 112 or R 115. The ADC 308 receives and periodically samples a decreased magnitude, phase-shifted version of F_SUM appearing across C or R, whichever the output waveform measurements are taken from. The ADC 308 samples the decreased magnitude, phase-shifted version of F_SUM according to a first sampling periodicity associated with the periodic voltage waveform of frequency F1, a second sampling periodicity associated with the periodic voltage waveform of frequency F2 . . . and an Nth sampling periodicity associated with the periodic voltage waveform of frequency FN. The ADC 308 outputs a numerical magnitude value corresponding to each periodic sample.

Some embodiments of the capacitive touch detection apparatus 300/400 also include one or more sample value table(s) 310, each sample value table 310 coupled to the ADC 308. It is noted that although sample value tables(s) are not shown in FIG. 4, some embodiments of the apparatus 400 may include sample value tables as described herein. Each sample value table stores a corresponding set of numerical magnitude values sampled according to the first sampling periodicity, the second sampling periodicity . . . or the Nth sampling periodicity.

The capacitive touch detection apparatus 300/400 also includes DFT logic modules DFT F1 312A, DFT F2 312B . . . DFT FN communicatively coupled to the ADC. Each DFT logic module 312A, 312B . . . DFT FN corresponds to a periodic waveform generator 305A, 305B . . . or periodic waveform generator FN. In some embodiments, the DFT logic modules 312A, 312B . . . DFT FN may be implemented as single bin ("SB") DFTs. Each DFT logic module 312A, 312B . . . DFT FN performs DFT operations on a set of numerical magnitude values sampled from one or more portions of a cycle of the decreased magnitude, phase-shifted version of the waveform F_SUM. Each set of sample values corresponds to the first sampling periodicity, the second sampling periodicity . . . or the Nth sampling periodicity. Each DFT logic module 312A, 312B . . . DFT FN generates a real numerical output value ("I_OUT_F1", "I_OUT_F2" . . . or "I_OUT_FN") and an imaginary numerical output value ("Q_OUT_F1", "Q_OUT_F2" . . . or "Q_OUT_FN") for each set of numerical magnitude sample values. If included in an embodiment of the capacitive touch detection apparatus 300/400, each sample value table 310 is coupled to a corresponding DFT logic module to store a set of numerical magnitude values as input values to the corresponding DFT logic module.

Some embodiments of the capacitive touch detection apparatus 300/400 also include a sampling clock (e.g., the sampling clock 315 of FIG. 3) coupled to the ADC 308 and communicatively coupled to the periodic waveform generators 305A, 305B . . . periodic waveform generator FN. The sampling clock (not shown on FIG. 4) clocks the periodic samples into the ADC 308. The sampling clock also synchronizes the periodic waveform generators 305A, 305B . . . periodic waveform generator FN to the sampling periodicities in order to provide accurate phase measurements between F_SUM and the decreased magnitude, phase-shifted version of F_SUM.

Some embodiments of the capacitive touch detection apparatus 300/400 also include a clock divider circuit "÷M" (e.g., the ÷M circuit 318 of FIG. 3). The ÷M circuit 318 lengthens the period of the sampling clock by an integer multiple M. Doing so by certain values of M such as the integer value four results in integer values in the sets of sample values generated by the ADC 308. Receiving integer values may simplify DFT operations by limiting such operations to addition and subtraction and avoiding more processor-intensive multiplication and division operations.

The capacitive touch detection apparatus 300/400 further includes one or more phase shift logic modules (e.g., the phase shift logic module 322 of FIG. 3). It is noted that components of each phase shift logic module associated with the apparatus 400 are shown in FIG. 4 and described below with reference to both FIGS. 3 and 4. However, for purposes of clarity, outlines and labels of the phase shift logic module blocks of the apparatus 400 are not shown in FIG. 4. Each phase shift logic module is coupled to a DFT logic module 312A, 312B . . . or DFT FN of a corresponding frequency. Each phase shift logic module receives the I_OUT value and the Q_OUT value from the corresponding DFT logic module 312A, 312B . . . or DFT FN. Each phase shift logic module determines a phase shift ("φ_DIFF_F1", "φ_DIFF_F2" . . . or "φ_DIFF_FN") between the periodic voltage waveform of frequency F1, F2 . . . or FN and the decreased magnitude, phase-shifted version of the periodic voltage waveform of frequency F1, F2 . . . or FN associated with the corresponding DFT logic module.

Each phase shift logic module of the apparatus 300/400 includes an output phase calculator (e.g., the F1 output phase calculator 325A and the F2 output phase calculator 325B). Each output phase calculator is coupled to the DFT_F1 312A, DFT_F2 312B . . . or to the DFT_FN corresponding to the frequency of the output phase calculator. For example, the F1 output phase calculator 325A is coupled to the DFT F1 312A. Each output phase calculator 325A, 325B . . . or FN output phase calculator determines an output phase value ("φ_OUTPUT_F1", "φ_OUTPUT_F2" . . . or "φ_OUTPUT_FN") associated with a corresponding decreased magnitude, phase-shifted version of the periodic voltage waveform of frequency F1, F2 . . . or FN. For example, the F1 output phase calculator 325A determines φ_OUTPUT_F1 as equal to arctan 2(I_OUT_F1, Q_OUT_F1). The F2 output phase calculator 325B determines φ_OUTPUT_F2 as equal to arctan 2(I_OUT_F2, Q_OUT_F2). The FN output phase calculator determines φ_OUTPUT_FN as equal to arctan 2(I_OUT_FN, Q_OUT_FN).

Each phase shift logic module of the apparatus 300/400 also includes an F1 input phase register 328A, an F2 input phase register 328B . . . or FN input phase register. Each input phase register stores a known input phase value φ_INPUT_F1, φ_INPUT_F2 . . . or φ_INPUT_FN associated with the corresponding periodic voltage waveform of frequency F1, F2 . . . or FN.

Each phase shift logic module of the apparatus 300/400 also includes a phase shift calculator (e.g., the F1 phase shift calculator 332A and the F2 phase shift calculator 332B). Each phase shift calculator is coupled to an output phase calculator of a corresponding frequency and to an input phase register of the corresponding frequency. For example, the F1 phase shift calculator 332A is coupled to the F1 output phase calculator 325A and to the F1 input phase register 328A. Each phase shift calculator determines the phase shift φ_DIFF_F1, φ_DIFF_F2 . . . or φ_DIFF_FN corresponding to the input and output waveforms of frequencies F1, F2 . . . and FN, respectively. For example, the F1 phase shift calculator 332A determines φ_DIFF_F1 as equal to (φ_OUTPUT_F1)–(φ_INPUT_F1). The F2 phase shift calculator 332B determines φ_DIFF_F2 as equal to (φ_OUTPUT_F2)–(φ_INPUT_F2). The FN phase shift calculator determines φ_DIFF_FN as equal to (φ_OUTPUT_FN)–(φ_INPUT_FN).

The capacitive touch detection apparatus 300/400 includes one or more phase shift to capacitance translators (e.g., the F1 phase shift to capacitance translator 130A and the F2 phase shift to capacitance translator 130B). Each phase shift to capacitance translator is coupled to a corresponding phase shift logic module (e.g., the phase shift logic module 322) of a corresponding frequency. Each phase shift to capacitance translator determines a potential value of C_TOUCH termed "C_TOUCH(φ_DIFF_F1)", "C_TOUCH(φ_DIFF_F2)" . . . or "C_TOUCH (φ_DIFF_FN)". Each C_TOUCH potential value C_TOUCH(φ_DIFF_F1), C_TOUCH(φ_DIFF_F2) . . . or C_TOUCH(φ_DIFF_FN) corresponds to the phase shift between the periodic voltage waveform of frequency F1, F2 . . . or FN and the corresponding decreased magnitude, phase-shifted version of the periodic voltage waveform of frequency F1, F2 . . . or FN. For example, the F1 phase shift to capacitance translator 130A determines C_TOUCH (φ_DIFF_F1) as equal to (tan φ_DIFF_F1)/(2*π*F1*R). The F2 phase shift to capacitance translator 130B determines C_TOUCH(φ_DIFF_F2) as equal to (tan φ_DIFF_F2)/(2*π*F2*R). The FN phase shift to capacitance translator determines C_TOUCH(φ_DIFF_FN) as equal to (tan φ_DIFF_FN)/(2*π*FN*R).

Some embodiments of the capacitive touch detection apparatus 300/400 also include one or more amplitude ratio logic modules (e.g., the amplitude ratio logic module 340 of FIG. 3. It is noted that components of each amplitude ratio logic module associated with the apparatus 400 are shown in FIG. 4 and described below with reference to both FIGS. 3 and 4. However, for purposes of clarity, outlines and labels of the amplitude ratio logic module blocks of the apparatus 400 are not shown in FIG. 4. Each amplitude ratio logic module is coupled to a DFT logic module of a corresponding frequency (e.g., the F1 amplitude ratio logic module is coupled to the DFT F1 logic module 312A and the F2 amplitude ratio logic module is coupled to the DFT F2 logic module 312B). Each amplitude ratio logic module receives the I_OUT value and the Q_OUT value from the corresponding DFT logic module and determines an amplitude ratio ("AR_F1", AR_F2". . . or "AR_FN") of the decreased magnitude, phase-shifted version of the periodic voltage waveform associated with the corresponding DFT logic module to the periodic voltage waveform associated with the corresponding DFT logic module.

Each amplitude ratio logic module includes an output amplitude calculator (e.g., the F1 output amplitude calculator 344A and the F2 output amplitude calculator 344B). Each output amplitude calculator is coupled to a DFT logic module of a corresponding frequency. For example, the F1 output amplitude calculator 344A is coupled to the DFT F1 logic module 312A. Each output amplitude calculator determines an output amplitude value ("A_OUTPUT_F1", "A_OUTPUT_F2". . . or "A_OUTPUT_FN") associated with a corresponding decreased magnitude, phase-shifted version of the periodic voltage waveform of frequency F1, F2 . . . or FN. For example, the F1 output amplitude calculator 344A calculates A_OUTPUT_F1 as sqrt [(I_OUT_F1)2+(Q_OUT_F1)2]. The F2 output amplitude calculator 344B calculates A_OUTPUT_F2 as sqrt [(I_OUT_F2)2+(Q_OUT_F2)2]. The FN output amplitude calculator calculates A_OUTPUT_FN as sqrt [(I_OUT_FN)2+(Q_OUT_FN)2].

In some embodiments of the capacitive touch detection apparatus 300/400 which include amplitude ratio logic module(s), each amplitude ratio logic module also includes an input amplitude register (e.g., the F1 input amplitude register 348A and the F2 input amplitude register 348B). Each input amplitude register stores the constant input amplitude value A_INPUT_F1, A_INPUT_F2 . . . or A_INPUT_FN associated with the corresponding periodic voltage waveform of frequency F1, F2 . . . or FN.

Each amplitude ratio logic module also includes an amplitude ratio calculator (e.g., the F1 amplitude ratio calculator 352A and the F2 amplitude ratio calculator 352B). Each amplitude ratio calculator is coupled to the an output amplitude calculator and to an input amplitude register of the corresponding frequency. For example, the F1 amplitude ratio calculator 352A is coupled to the F1 output amplitude calculator 344A and to the F1 input amplitude register 348A. Each amplitude ratio calculator determines an amplitude ratio AR_F1, AR_F2 . . . or AR_FN of the corresponding decreased magnitude, phase-shifted version of the periodic voltage waveform of frequency F1, F2 . . . or FN to the periodic voltage waveform of frequency F1, F2 . . . or FN. For example, the F1 amplitude ratio calculator 352A determines AR_F1 as equal to A_OUTPUT_F1/A_INPUT_F1. The F2 amplitude ratio calculator 352B determines AR_F2 as equal to A_OUTPUT_F2/A_INPUT_F2. The FN amplitude ratio calculator determines AR_FN as equal to A_OUTPUT_FN/A_INPUT_FN.

Embodiments of the capacitive touch detection apparatus 300/400 which include amplitude ratio logic module(s) also include one or more amplitude ratio to capacitance translators (e.g., the F1 amplitude ratio to capacitance translator 160A and the F2 amplitude ratio to capacitance translator 160B). Each amplitude ratio to capacitance translator is coupled to an amplitude ratio logic module (e.g., the amplitude ratio logic module 340) of a corresponding frequency. For example, the F1 amplitude ratio to capacitance translator 160A is coupled to the F1 amplitude ratio logic module. Each amplitude ratio logic module determines a potential C_TOUCH capacitance value "C_TOUCH(AR_F1)", "C_TOUCH(AR_F2)" . . . or "C_TOUCH(AR_FN)" corresponding to an amplitude ratio of the corresponding decreased magnitude, phase-shifted version of the periodic voltage waveform of frequency F1, F2 . . . or FN to the periodic voltage waveform of frequency F1, F2 . . . or FN. For example, the F1 amplitude ratio to capacitance translator 160A determines C_TOUCH(AR_F1) as equal to $[(1-AR\_F12)]\frac{1}{2}/(2*\pi*F1*R*AR\_F1)$. The F2 amplitude ratio to capacitance translator 160B determines C_TOUCH (AR_F2) as equal to $[(1-AR\_F22)]\frac{1}{2}/(2*\pi*F2*R*AR\_F2)$. The FN amplitude ratio to capacitance translator determines C_TOUCH(AR_FN) as equal to $[(1-AR\_FN2)]\frac{1}{2}/(2*\pi*FN*R*AR\_FN)$.

Some embodiments of the capacitive touch detection apparatus 300/400 include C_TOUCH validation logic 165 as described above with respect to the apparatus 100. The C_TOUCH validation logic 165 is coupled to the phase shift to capacitance translator(s) 130A, 130B . . . and to the Nth phase shift to capacitance translator. The C_TOUCH validation logic 165 is also coupled to the amplitude ratio to capacitance translator(s) 160A, 160B . . . and to the Nth amplitude ratio to capacitance translator. The C_TOUCH validation logic 165 receives one or more values of C_TOUCH($\phi$_DIFF) and/or one or more values of C_TOUCH(AR).

Some embodiments of the C_TOUCH validation logic 165 compare two or more of the potential C_TOUCH values C_TOUCH($\phi$_DIFF_F1), C_TOUCH($\phi$_DIFF_F2) . . . C_TOUCH($\phi$_DIFF_FN), C_TOUCH(AR_F1), C_TOUCH (AR_F2) . . . and C_TOUCH(AR_FN). The comparison operations determine whether a difference between the potential C_TOUCH values is greater than a selected value C_TOUCH_MAX_DIFFERENCE. These embodiments of the C_TOUCH validation logic 165 output a numerical average of the potential C_TOUCH values as C_TOUCH_OUT if the difference between the potential C_TOUCH values is not greater than the selected value C_TOUCH_MAX_DIFFERENCE. An invalidity flag C_TOUCH_MEASUREMENT_INVALID is output from the C_TOUCH validation logic 165 if the difference between the potential C_TOUCH values is greater than the selected value C_TOUCH_MAX_DIFFERENCE. Some embodiments of the capacitive touch detection apparatus 300/400 also include a register 175 coupled to the C_TOUCH validation logic 165. The register 175 contains the selected value C_TOUCH_MAX_DIFFERENCE.

Some embodiment of the capacitive touch detection apparatus 300/400 perform weighted averaging operations on the potential C_TOUCH values C_TOUCH($\phi$_DIFF_F1), C_TOUCH($\phi$_DIFF_F2) . . . C_TOUCH($\phi$_DIFF_FN), C_TOUCH(AR_F1), C_TOUCH(AR_F2) . . . and C_TOUCH(AR_FN). Such embodiments output a weighted average of the potential C_TOUCH values as C_TOUCH_OUT. Some such embodiments may output averages of the potential C_TOUCH values as C_TOUCH_OUT without regard to differences between the potential C_TOUCH values.

Figure 5:
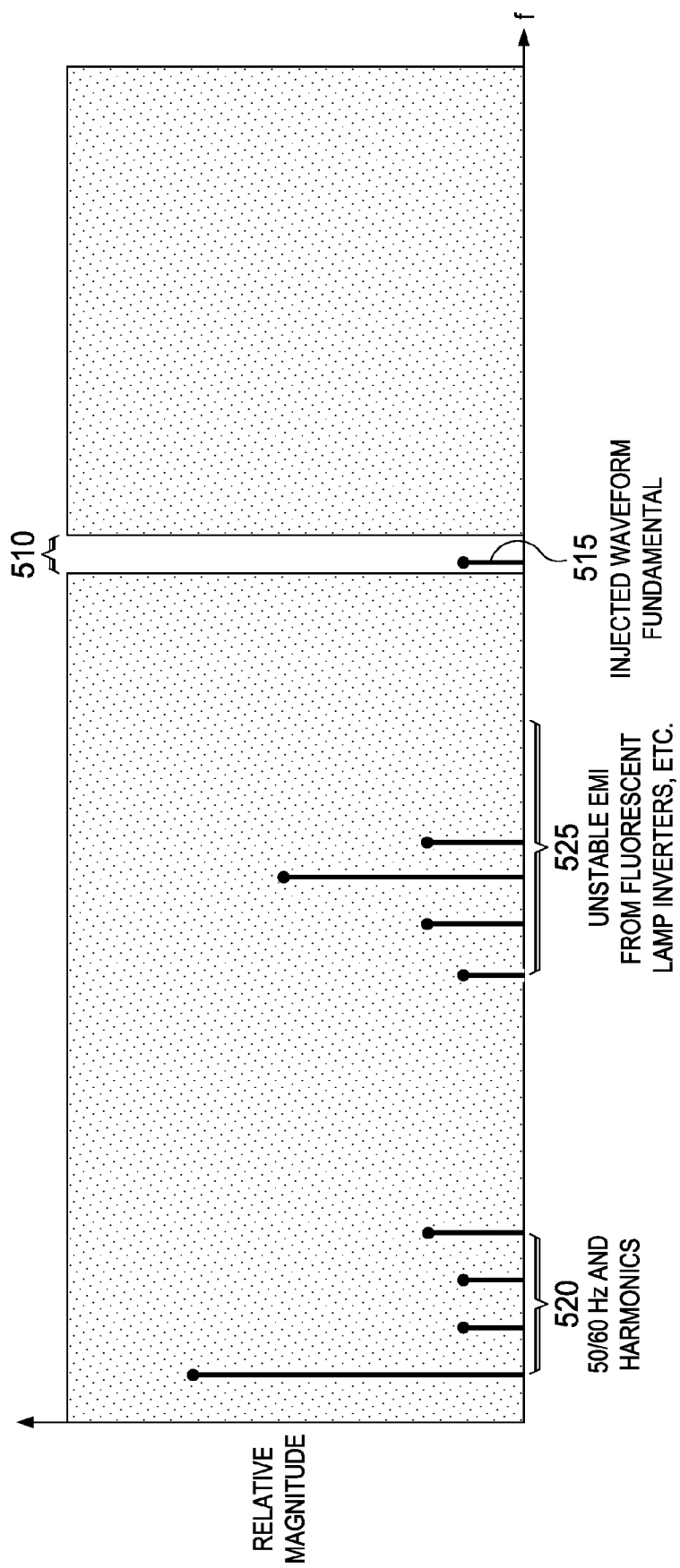
FIG. 5 is a frequency plot illustrating a filtering effect associated with a capacitive touch detection apparatus according to various example embodiments.

FIG. 5 is a frequency plot illustrating a filtering effect associated with the capacitive touch detection apparatus 300/400 according to various example embodiments. The DFT embodiments illustrated by the example apparatus 300/400 have the advantage of creating a narrow-band filter 510 around the waveform generator frequency 515. The narrow-band filter 510 excludes previously-discussed EMI frequency components (e.g., the EMI components 520 and 525) occurring outside of the narrow-band filter 510 associated with the waveform generator frequency 515. However, the frequencies of the EMI components may quickly change position over time.

The apparatus 400 may overcome this problem by implementing two or more periodic waveform generators, each of a different frequency. The apparatus 400 may use capacitance values determined from measurements utilizing a waveform generator frequency not subject to unacceptable levels of EMI frequency components at the time of a particular instantaneous touch element capacitance measurement. Some embodiments of the capacitive touch detection apparatus 300 may perform a similar function by changing the frequency of the single periodic waveform generator when capacitance measurements are deemed unreliable by the C_TOUCH validation logic 165. However, a subsequent C_TOUCH measurement at a different frequency may be subject to one or more EMI frequency components having moved to the new waveform generator frequency by the time the subsequent C_TOUCH measurement is made.

Figure 6A:
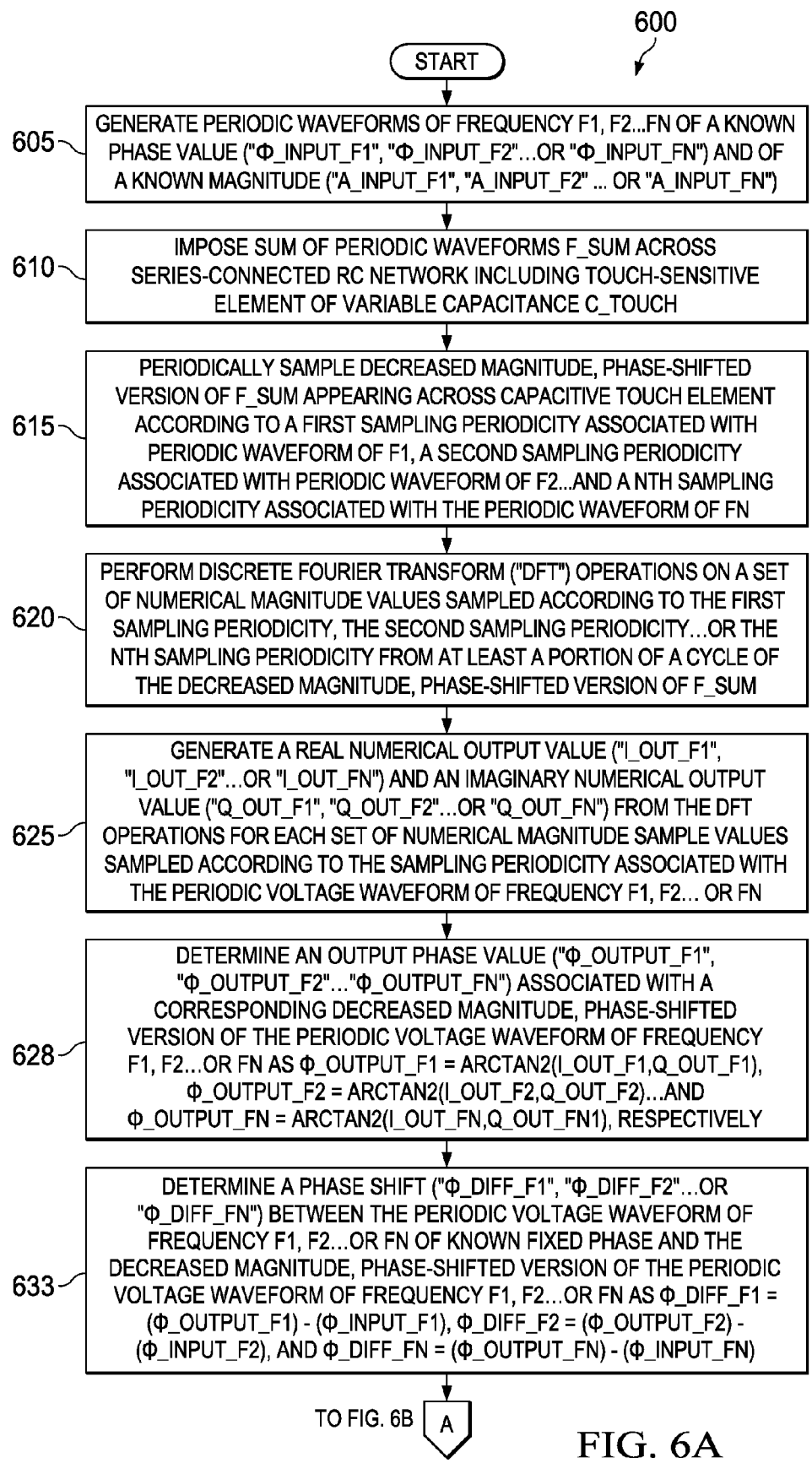
FIGS. 6A-6C are a flow diagram illustrating an example method of capacitive touch detection according to various example activities.
Figure 6B:
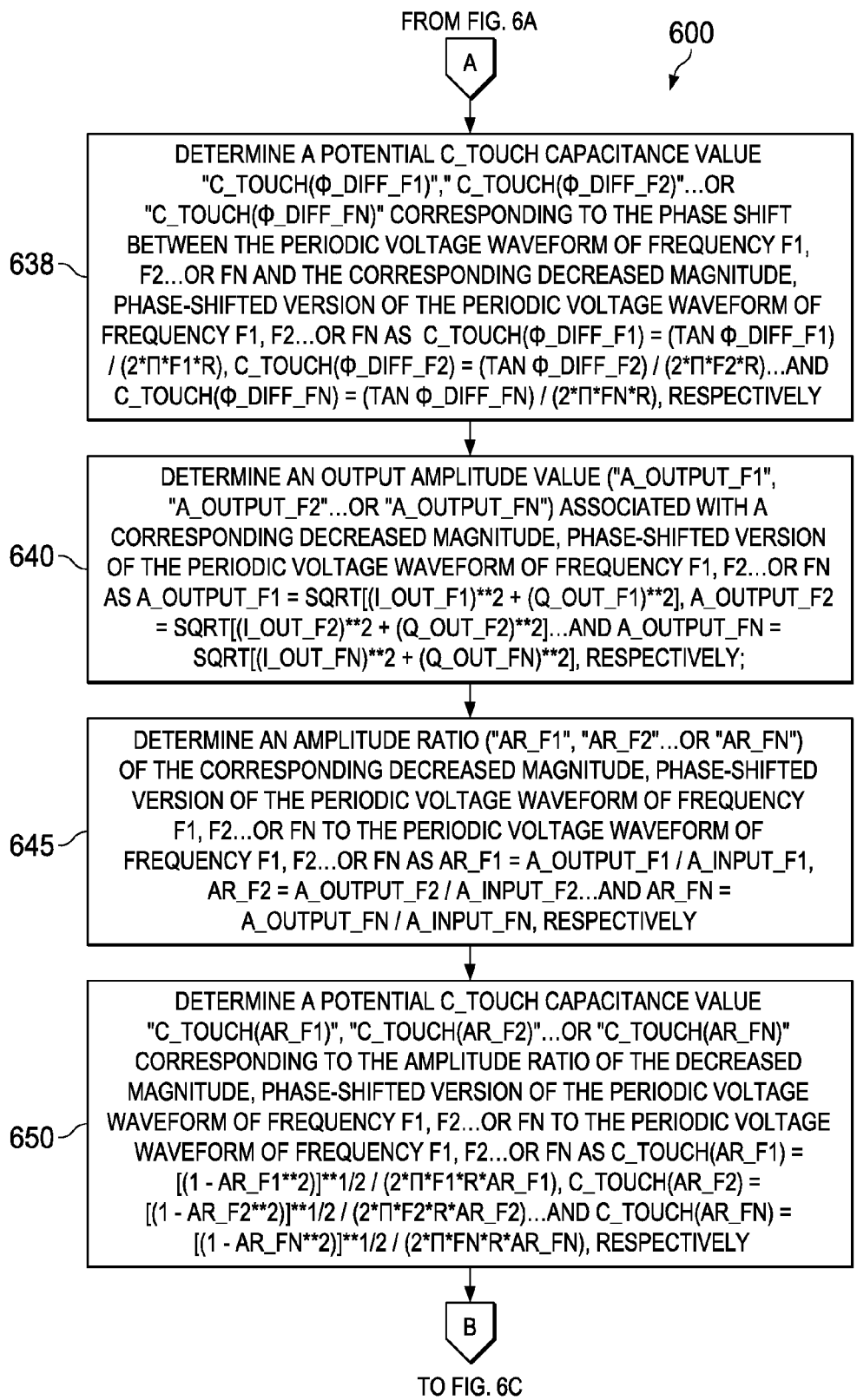
Figure 6C:
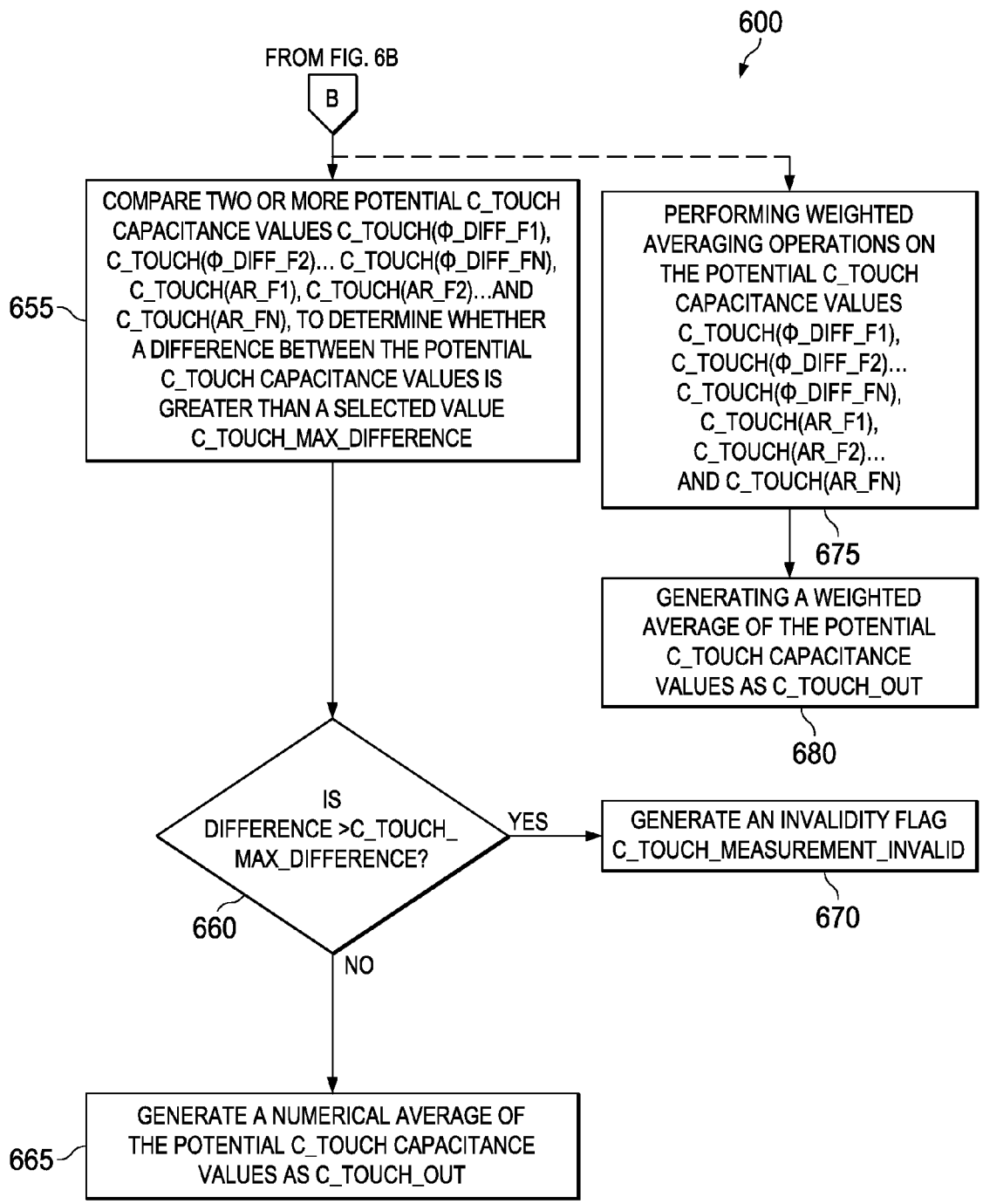

FIGS. 6A-6C are a flow diagram illustrating an example method 600 of capacitive touch detection according to various example activities. The method 600 commences at block 605 with generating one or more periodic waveforms. Each periodic waveform is of a frequency F1, F2 . . . or FN, of a known phase value $\phi$_INPUT_F1, $\phi$_INPUT_F2 . . . or $\phi$_INPUT_FN and of a known amplitude A_INPUT_F1, A_INPUT_F2 . . . or A_INPUT_FN.

The method 600 continues at block 610 with imposing a sum ("F_SUM") of the periodic voltage waveforms across a series-connected RC network. The RC network includes a capacitive touch element C of variable capacitance C_TOUCH and a resistor R. The parameter C_TOUCH is a function of a proximity of a dielectric mass to C.

The method 600 includes periodically sampling a decreased magnitude, phase-shifted version of F_SUM appearing across either C or R, at block 615. The decreased magnitude, phase-shifted version of F_SUM is sampled according to a first sampling periodicity associated with the input periodic voltage waveform of frequency F1, a second sampling periodicity associated with the input periodic voltage waveform of frequency F2 . . . and an Nth sampling periodicity associated with the input periodic voltage waveform of frequency FN.

The method 600 also includes performing DFT operations on a set of numerical magnitude values sampled according to the first sampling periodicity, the second sampling periodicity . . . or the Nth sampling periodicity from one or more portions of a cycle of the decreased magnitude, phase-shifted version of F_SUM, at block 620. The method 600 further includes generating a real numerical output value I_OUT_F1, I_OUT_F2 . . . or I_OUT_FN and an imaginary numerical output value Q_OUT_F1, Q_OUT_F2 . . . or Q_OUT_FN from the DFT operations for each set of numerical magnitude sample values, at block 625.

The method 600 continues at block 628 with determining an output phase value $\phi$_OUTPUT_F1, $\phi$_OUTPUT_F2 . . . or $\phi$_OUTPUT_FN. The output phase value is associated with a corresponding decreased magnitude, phase-shifted version of the periodic voltage waveform of frequency F1, F2 . . . or FN. The output phase value is calculated as $\phi$_OUTPUT_F1=arctan 2(I_OUT_F1, Q_OUT_F1), $\phi$_OUTPUT_F2=arctan 2(I_OUT_F2, Q_OUT_F2) . . . and $\phi$_OUTPUT_FN=arctan 2(I_OUT_FN,Q_OUT_FN1), respectively.

The method 600 also includes determining a phase shift $\phi$_DIFF_F1, $\phi$_DIFF_F2 . . . or $\phi$_DIFF_FN between the periodic voltage waveform of frequency F1, F2 . . . or FN and the decreased magnitude, phase-shifted version of the periodic voltage waveform of frequency F1, F2 . . . or FN, at block 633. The phase shift is calculated as $\phi$_DIFF_F1=($\phi$_OUTPUT_F1)−($\phi$_INPUT_F1), $\phi$_DIFF_F2=($\phi$_OUTPUT_F2)−($\phi$_INPUT_F2), and $\phi$_DIFF_FN=($\phi$_OUTPUT_FN)−($\phi$_INPUT_FN), respectively.

The method 600 further includes determining a potential value of C_TOUCH($\phi$_DIFF_F1), C_TOUCH($\phi$_DIFF_F2) . . . or C_TOUCH($\phi$_DIFF_FN), at block 638. The potential value of C_TOUCH corresponds to the phase shift between the periodic voltage waveform of frequency F1, F2 . . . or FN and the corresponding decreased magnitude, phase-shifted version of the periodic voltage waveform of frequency F1, F2 . . . or FN. The potential values of C_TOUCH are calculated as C_TOUCH($\phi$_DIFF_F1)=(tan $\phi$_DIFF_F1)/(2*$\pi$*F1*R), C_TOUCH($\phi$_DIFF_F2)=(tan $\phi$_DIFF_F2)/(2*$\pi$*F2*R) . . . and C_TOUCH($\phi$_DIFF_FN)=(tan $\phi$_DIFF_FN)/(2*$\pi$*FN*R), respectively.

The method 600 continues at block 640 with determining an output amplitude value A_OUTPUT_F1, A_OUTPUT_F2 . . . or A_OUTPUT_FN associated with a corresponding decreased magnitude, phase-shifted version of the periodic voltage waveform of frequency F1, F2 . . . or FN. The output amplitude values are calculated as A_OUTPUT_F1=sqrt[(I_OUT_F1)2+(Q_OUT_F1)2], A_OUTPUT_F2=sqrt[(I_OUT_F2)2+(Q_OUT_F2)2] . . . and A_OUTPUT_FN=sqrt[(I_OUT_FN)2+(Q_OUT_FN)2], respectively;

The method 600 includes determining an amplitude ratio AR_F1, AR_F2 . . . or AR_FN of the corresponding decreased magnitude, phase-shifted version of the periodic voltage waveform of frequency F1, F2 . . . or FN to the periodic voltage waveform of frequency F1, F2 . . . or FN. The amplitude ratios are calculated as AR_F1=A_OUTPUT_F1/A_INPUT_F1, AR_F2=A_OUTPUT_F2/A_INPUT_F2 . . . and AR_FN=A_OUTPUT_FN/A_INPUT_FN, respectively.

The method 600 also includes determining a potential value of C_TOUCH, C_TOUCH(AR_F1), C_TOUCH(AR_F2) . . . or C_TOUCH(AR_FN), at block 650. The potential value of C_TOUCH corresponds to the amplitude ratio of the decreased magnitude, phase-shifted version of the periodic voltage waveform of frequency F1, F2 . . . or FN to the periodic voltage waveform of frequency F1, F2 . . . or FN. The potential values of C_TOUCH are calculated as C_TOUCH(AR_F1)=[(1−AR_F12)]½/(2*$\pi$*F1*R*AR_F1), C_TOUCH(AR_F2)=[(1−AR_F22)]½/(2*$\pi$*F2*R*AR_F2) . . . and C_TOUCH(AR_FN)=[(1−AR_FN2)]½/(2*$\pi$*FN*R*AR_FN), respectively.

The method 600 further includes comparing two or more of the potential values of C_TOUCH, C_TOUCH($\phi$_DIFF_F1), C_TOUCH($\phi$_DIFF_F2) . . . C_TOUCH($\phi$_DIFF_FN), C_TOUCH(AR_F1), C_TOUCH(AR_F2) . . . and C_TOUCH(AR_FN), at block 655. The method 600 continues at block 660 with determining whether a difference between the potential values of C_TOUCH is greater than a selected value C_TOUCH_MAX_DIFFERENCE. The method 600 includes generating a numerical average of the potential values of C_TOUCH as C_TOUCH_OUT if a difference between the potential values of C_TOUCH is not greater than the selected value C_TOUCH_MAX_DIFFERENCE, at block 665. The method 600 also includes generating an invalidity flag C_TOUCH_MEASUREMENT_INVALID if a difference between the potential values of C_TOUCH is greater than the selected value C_TOUCH_MAX_DIFFERENCE, at block 670.

In some example sequences, the method 600 includes performing weighted averaging operations on the C_TOUCH potential values C_TOUCH($\phi$_DIFF_F1), C_TOUCH($\phi$_DIFF_F2) . . . C_TOUCH($\phi$_DIFF_FN), C_TOUCH(AR_F1), C_TOUCH(AR_F2) . . . and C_TOUCH(AR_FN), at block 675. The weighted averaging operations may be performed without regard to differences between the potential values of C_TOUCH. The method 600 may, in such case, include generating a weighted average of the potential values of C_TOUCH as C_TOUCH_OUT, at block 680.

Methods and apparatus described herein may be useful in applications other than capacitive touch sensor detection. The apparatus 100, 300, and 400 and the method 600 are intended to provide a general understanding of the sequences of various methods and the structures of various embodiments. They are not intended to serve as complete descriptions of all elements and features of methods, apparatus and systems that might make use of these example sequences and structures.

The various embodiments may be incorporated into semiconductor analog and digital circuits for use in receptacle power converters, electronic circuitry used in computers, communication and signal processing circuitry, single-processor or multi-processor modules, single or multiple embedded processors, multi-core processors, data switches, and application-specific modules including multi-layer, multi-chip modules, among others. Such apparatus and systems may further be included as sub-components within a variety of electronic systems such as robotics, medical devices (e.g., heart monitor, blood pressure monitor, etc.), motor vehicles, televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), set top boxes, household appliances and others.

Methods and structures disclosed herein sense and measure capacitance variations from capacitive touch sensors by measuring phase shifts between sensor input and output signals. Phase shifts and amplitude ratio variations may be measured via apparatus and methods including DFT operations that filter EMI frequency components from the touch sensor signals. Sensor capacitance variations obtained from combinations of multi-frequency sensor signals, sensor input/output phase shifts and input/output signal magnitude ratio measurements may be compared to determine their validity. These structures and methods improve the sensitivity of capacitive sensor systems, including the unexpected result that capacitance variations down to single-digit femtofarads may be reliably sensed.

By way of illustration and not of limitation, the accompanying figures show specific aspects in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The aspects illustrated are described in sufficient detail to enable those skilled in the art to practice the teachings disclosed herein. Other aspects may be used and derived therefrom, such that structural and logical substitutions and changes may be made without departing from the scope of this disclosure. This Detailed Description, therefore, is not to be taken in a limiting sense. The breadth of various aspects is defined by the appended claims and the full range of equivalents to which such claims are entitled.

Such aspects of the inventive subject matter may be referred to herein individually or collectively by the term "invention" merely for convenience and without intending to voluntarily limit this application to any single invention or inventive concept, if more than one is in fact disclosed. Thus, although specific aspects have been illustrated and described herein, any arrangement calculated to achieve the same purpose may be substituted for the specific aspects shown. This disclosure is intended to cover any and all adaptations or variations of various aspects.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing on its own as a separate embodiment.

What is claimed is:

1. A capacitive touch detection apparatus, comprising:
   a periodic waveform generator coupled to a series-connected resistive-capacitive ("RC") network, the RC network including a capacitive touch element of a variable capacitance and a resistor, the variable capacitance being a function of a proximity of a dielectric mass to the capacitive touch element, the periodic waveform generator to generate a periodic voltage waveform of frequency F and to apply the periodic voltage waveform across the RC network;
   a phase shift detector with a first input coupled to the RC network to receive the periodic voltage waveform and a second input communicatively coupled to one of the capacitive touch element or the resistor to receive a decreased magnitude, phase-shifted version of the periodic voltage waveform appearing across the one of the capacitive touch element or the resistor, the phase shift detector to measure a phase shift between the periodic voltage waveform and the decreased magnitude, phase-shifted version of the periodic voltage waveform; and
   a phase shift to capacitance translator coupled to an output of the phase shift detector to convert the phase shift to a first measure of the variable capacitance based on the following equation:

$C\_TOUCH(\phi\_DIFF) = (\tan \phi\_DIFF)/(2 * \pi * f * R)$, where $C\_TOUCH(\phi\_DIFF)$ represents the first measure of the variable capacitance of the capacitive touch element, $\phi\_DIFF$ represents the phase shift measured between the periodic voltage waveform and the decreased magnitude, phase-shifted version of the periodic voltage waveform, f corresponds to the frequency F, and R represents a resistance of the resistor.

2. The capacitive touch detection apparatus of claim 1, wherein the periodic waveform generator is selected from one of a sine wave generator, a triangular wave generator, a square wave generator, and a pulse wave generator.

3. The capacitive touch detection apparatus of claim 1, further comprising:
   an amplitude ratio detector with a first input coupled to the RC network to receive the periodic voltage waveform and a second input communicatively coupled to the one of the capacitive touch element or the resistor to receive the decreased magnitude, phase-shifted version of the periodic voltage waveform, the amplitude ratio detector to measure an amplitude of the periodic voltage waveform and an amplitude of the decreased magnitude, phase-shifted version of the periodic voltage waveform and to determine a ratio of the amplitude of the decreased magnitude, phase-shifted version of the periodic voltage waveform to the amplitude of the periodic voltage waveform.

4. The capacitive touch detection apparatus of claim 3, further comprising:
   an amplitude ratio to capacitance translator coupled to the amplitude ratio detector to convert the ratio to a second measure of the variable capacitance based on the following equation:

$C\_TOUCH(A\_RATIO) = [(1 - A\_RATIO2)]1/2 / (2*\pi*f*R*A\_RATIO)$, where $C\_TOUCH(A\_RATIO)$ represents the second measure of the variable capacitance of the capacitive touch element, $A\_RATIO$ represents the ratio of the amplitude of the decreased magnitude, phase-shifted version of the periodic voltage waveform to the amplitude of the periodic voltage waveform, f corresponds to the frequency F, and R represents a resistance of the resistor.

5. The capacitive touch detection apparatus of claim 3, further comprising:
   an amplifier input coupled to the one of the capacitive touch element or the resistor, an output of the amplifier coupled to at least one of the second input of the phase shift detector or the second input of the amplitude ratio detector, the amplifier to reduce impedance loading of the one of the capacitive touch element or the resistor by the phase shift detector, the amplitude ratio detector, or both.

6. The capacitive touch detection apparatus of claim 5, further comprising:
   validation logic coupled to the phase shift to capacitance translator and to the amplitude ratio to capacitance translator to receive the first and second measures of the variable capacitance, to determine a difference between the first and second measures of the variable capacitance, to determine whether the difference is greater than a maximum selected difference, to output a final value of the variable capacitance as a function of at least one of the first or second measures of the variable capacitance if the difference is less than or equal to the maximum selected difference, and to output an invalidity indication if the difference is greater than the maximum selected difference; and a register coupled to the validation logic to store the value of the maximum selected difference.

7. A capacitive touch detection apparatus, comprising:

N periodic waveform generators coupled to a series-connected resistive-capacitive ("RC") network, the RC network including a capacitive touch element of a variable capacitance and a resistor, the variable capacitance being a function of a proximity of a dielectric mass to the capacitive touch element, the periodic waveform generators to generate N periodic voltage waveforms, and to apply a sum of the N periodic voltage waveforms across the RC network, each of the periodic waveform generators to generate a periodic voltage waveform of a respective one of N frequencies F1 to FN of a respective amplitude and a respective phase value, where N is an integer greater than or equal to two;

an analog-to-digital converter ("ADC") communicatively coupled to one of the capacitive touch element or the resistor to receive and to periodically sample a decreased magnitude, phase-shifted version of the sum of the N periodic voltage waveforms appearing across the one of the capacitive touch element or the resistor according to N sampling periodicities, each of the seriodicities being associated with a respective one of the frequencies, and to output a numerical magnitude value corresponding to each periodic sample;

a plurality of discrete Fourier transform ("DFT") logic modules, each of the DFT logic modules corresponding to a respective one of the periodic waveform generators, and communicatively coupled to the ADC, each of the DFT logic modules to perform DFT operations on a set of numerical magnitude values sampled according to a respective one of the periodicities from at least a portion of a cycle of the decreased magnitude, phase-shifted version of the sum of the N periodic voltage waveforms, each of the DFT logic modules to generate a real numerical output value and an imaginary numerical output value for each set of numerical magnitude sample values;

a plurality of phase shift logic modules, each of the phase shift logic modules being coupled to a corresponding DFT logic module to receive the real numerical output value and the imaginary numerical output value from the corresponding DFT logic module and to determine a phase shift between a respective one of the periodic voltage waveforms associated with the corresponding DFT logic module and a decreased magnitude, phase-shifted version of the respective one of the periodic voltage waveforms associated with the corresponding DFT logic module; and a plurality of phase shift to capacitance translators, each of the phase shift to capacitance translators being coupled to a corresponding phase shift logic module to determine a respective one of a plurality of potential values of the variable capacitance based on a respective one of a plurality of phase shifts determined by the phase shift logic modules, the phase shift to capacitance translators to determine the potential values based on one or more of the following equations:

$$C\_TOUCH(\phi\_DIFF\_F1)=(\tan \phi\_DIFF\_F1)/(2*\pi*F1*R),$$

$$C\_TOUCH(\phi\_DIFF\_F2)=(\tan \phi\_DIFF\_F2)/(2*\pi*F2*R), \text{ and}$$

$$C\_TOUCH(\phi\_DIFF\_FN)=(\tan \phi\_DIFF\_FN)/(2*\pi*FN*R),$$

where $C\_TOUCH(\phi\_DIFF\_F1)$, $C\_TOUCH(\phi\_DIFF\_F2)$, and $C\_TOUCH(\phi\_DIFF\_FN)$ represent potential values of the variable capacitance of the capacitive touch element calculated based on $\phi\_DIFF\_F1$, $\phi\_DIFF\_F2$, and $\phi\_DIFF\_FN$, respectively, where $\phi\_DIFF\_F1$, $\phi\_DIFF\_F2$, and $\phi\_DIFF\_FN$ represent phase shifts determined between the periodic voltage waveforms of frequencies F1, F2, and FN, respectively, and decreased magnitude, phase-shifted versions of the periodic voltage waveforms of frequencies F1, F2, and FN, respectively, and R represents a resistance of the resistor.

8. The capacitive touch detection apparatus of claim 7, wherin each DFT logic module is a single bin ("SB") DFT logic module.

9. The capacitive touch detection apparatus of claim 7, further comprising:

a plurality of sample value tables, each of the sample value tables being coupled to the ADC to store a corresponding set of numerical magnitude values sampled according to a respective one of the plurality of sampling periodicities.

10. The capacitive touch detection apparatus of claim 7, each of the phase shift logic modules further comprising:

an output phase calculator to determine an output phase value associated with a corresponding decreased magnitude, phase-shifted version of a periodic voltage waveform based on one or more of the following equations:

$$\phi\_OUTPUT\_F1=\arctan 2(I\_OUT\_F1,Q\_OUT\_F1),$$

$$\phi\_OUTPUT\_F2=\arctan 2(I\_OUT\_F2,Q\_OUT\_F2), \text{ and}$$

$$\phi\_OUTPUT\_FN=\arctan 2(I\_OUT\_FN,Q\_OUT\_FN),$$

where $\phi\_OUTPUT\_F1$, $\phi\_OUTPUT\_F2$, and $\phi\_OUTPUT\_FN$ represent output phase values for corresponding decreased magnitude, phase-shifted versions of the N periodic voltage waveforms, where $I\_OUT\_F1$, $I\_OUT\_F2$, and $I\_OUT\_FN$ represent real numerical output values generated by respective DFT logic modules, and where $Q\_OUT\_F1$, $Q\_OUT\_F2$, and $Q\_OUT\_FN$ represent imaginary numerical output values generated by respective DFT logic modules;

an input phase register to store an input phase value associated with a corresponding periodic voltage waveform; and a phase shift calculator coupled to the output phase calculator and to the input phase register to calculate the phase shift based on one or more of the following equations:

$$\phi\_DIFF\_F1=(\phi\_OUTPUT\_F1)-(\phi\_INPUT\_F1),$$

$$\phi\_DIFF\_F2=(\phi\_OUTPUT\_F2)-(\phi\_INPUT\_F2), \text{ and}$$

$$\phi\_DIFF\_FN=(\phi\_OUTPUT\_FN)-(\phi\_INPUT\_FN),$$

where ϕ_DIFF_F1, ϕ_DIFF_F2, and ϕ_DIFF_FN represent phase shifts determined between periodic voltage waveforms of frequencies F1, F2, and FN, respectively, and decreased magnitude, phase-shifted versions of the periodic voltage waveforms of frequencies F1, F2 and FN, respectively, where ϕ_OUTPUT_F1, ϕ_OUTPUT_F2, and ϕ_OUTPUT_FN represent output phase values for decreased magnitude, phase-shifted versions of the periodic voltage waveforms of frequencies F1, F2 and FN, respectively, and where ϕ_INPUT_F1, ϕ_INPUT_F2, ϕ_INTPUT_FN represent phase values associated with periodic voltage waveforms of frequency F1, F2, and FN, respectively.

11. The capacitive touch detection apparatus of claim 7, further comprising:
   validation logic coupled to each phase shift to capacitance translator to compare at least two of the potential values of the variable capacitance, to determine whether a difference between the potential values of the variable capacitance is greater than a selected value, to output a numerical average of the potential values of the variable capacitance as an output value if the difference between the potential values of the variable capacitance is not greater than the selected value, and to output an invalidity flag if the difference between the potential values of the variable capacitance is greater than the selected value; and
   a register coupled to the variable capacitance validation logic to contain the selected value.

12. The capacitive touch detection apparatus of claim 7, further comprising:
   a plurality of amplitude ratio logic modules, each of the amplitude ratio logic modules being coupled to a corresponding DFT logic module to receive the real numerical output value and the imaginary numerical output value from the corresponding DFT logic module and to determine an amplitude ratio of the decreased magnitude, phase-shifted version of the periodic voltage waveform associated with the corresponding DFT logic module to the periodic voltage waveform associated with the corresponding DFT logic module; and
   a plurality of amplitude ratio to capacitance translators, each of the amplitude ratio to capacitance translators being coupled to a corresponding amplitude ratio logic module to determine a potential value of the variable capacitance corresponding to an amplitude ratio of the corresponding decreased magnitude, phase-shifted version of the periodic voltage waveform of a respective one of the frequencies to the periodic voltage waveform of the respective one of the frequencies based on one or more of the following equations:

$$C\_TOUCH(AR\_F1) = [(1 - AR\_F1^{}2)]^{}1/2 / (2 * \pi * F1 * R * AR\_F1),$$

$$C\_TOUCH(AR\_F2) = [(1 - AR\_F2^{}2)]^{}1/2 / (2 * \pi * F2 * R * AR\_F2), \text{ and}$$

$$C\_TOUCH(AR\_FN) = [(1 - AR\_FN^{}2)]^{}1/2 / (2 * \pi * FN * R * AR\_FN),$$

where C_TOUCH(AR_F1), C_TOUCH(AR_F2), and C_TOUCH(AR_FN) represent potential values of the variable capacitance of the capacitive touch element determined based on AR_F1, AR_F2, and AR_FN, respectively, where AR_F1, AR_F2, and AR_FN represent ratios of decreased magnitude, phase-shifted versions of the periodic voltage waveforms associated with respective DFT logic modules to periodic voltage waveforms associated with respective DFT logic modules, where F1, F2 and FN correspond to frequencies, and R represents a resistance of the resistor.

13. The capacitive touch detection apparatus of claim 12, each of the amplitude ratio logic modules further comprising:
   an output amplitude calculator to determine an output amplitude value associated with a corresponding decreased magnitude, phase-shifted version of the periodic voltage waveform of frequency F1, F2 . . . or FN based on one or more of the following equations:

$$A\_OUTPUT\_F1 = \text{sqrt}[(I\_OUT\_F1)^{}2 + (Q\_OUT\_F1)^{}2],$$

$$A\_OUTPUT\_F2 = \text{sqrt}[(I\_OUT\_F2)^{}2 + (Q\_OUT\_F2)^{}2], \text{ and}$$

$$A\_OUTPUT\_FN = \text{sqrt}[(I\_OUT\_FN)^{}2 + (Q\_OUT\_FN)^{}2],$$

where A_OUTPUT_F1, A_OUTPUT_F2, A_OUTPUT_FN represent output amplitude values for decreased magnitude, phase-shifted versions of periodic voltage waveforms of frequencies F1, F2, and FN, respectively, where I_OUT_F1, I_OUT_F2, and I_OUT_FN represent real numerical output values generated by respective DFT logic modules, and where Q_OUT_F1, Q_OUT_F2, and Q_OUT_FN represent imaginary numerical output values generated by respective DFT logic modules;
   an input amplitude register to store a constant input amplitude value associated with a corresponding periodic voltage waveform; and
   an amplitude ratio calculator coupled to the output amplitude calculator and to the input amplitude register to determine an amplitude ratio of a corresponding decreased magnitude, phase-shifted version of the periodic voltage waveform to the periodic voltage waveform based on one or more of the following equations:

$$AR\_F1 = A\_OUTPUT\_F1 / A\_INPUT\_F1,$$

$$AR\_F2 = A\_OUTPUT\_F2 / A\_INPUT\_F2, \text{ and}$$

$$AR\_FN = A\_OUTPUT\_FN / A\_INPUT\_FN, \text{ respectively}$$

where AR_F1, AR_F2 and AR_FN represent amplitude ratios of corresponding decreased magnitude, phase-shifted versions of periodic voltage waveforms of frequencies F1, F2, and FN, respectively, to periodic voltage waveforms of frequencies F1, F2, and FN, respectively, where A_OUTPUT_F1, A_OUTPUT_F2, and A_OUTPUT_FN represent output amplitude values for decreased magnitude, phase-shifted versions of periodic voltage waveforms of frequencies F1, F2, and FN, respectively, and where A_INPUT_F1, A_INPUT_F2, and A_INPUT_FN represent constant input amplitude values associated with periodic voltage waveforms of frequencies F1, F2, and FN, respectively.

14. The capacitive touch detection apparatus of claim 12, further comprising:
   validation logic coupled to each of the phase shift to capacitance translators and to each of the amplitude ratio to capacitance translators to compare at least two of the potential values, of the variable capacitance, to determine whether a difference between the potential values of the variable capacitance is greater than a selected value, to output a numerical average of the potential values of the variable capacitance as an output value if the difference between the potential values of the variable capacitance is not greater than the selected value, and to output an invalidity flag if the difference between the potential values of the variable capacitance is greater than the selected value; and a register coupled to the validation logic to contain the selected value.

15. The capacitive touch detection apparatus of claim 12, further comprising:

validation logic coupled to each of the phase shift to capacitance translators and to each of the amplitude ratio to capacitance translators to perform weighted averaging operations on the potential values of the variable capacitance and to output a weighted average of the potential values of the variable capacitance as an output value.

16. A method of capacitive touch detection, comprising:

applying a sum of at least two input periodic voltage waveforms of frequencies F1 and F2 across a series-connected resistive-capacitive ("RC") network, the RC network including a capacitive touch element of variable capacitance and a resistor, the variable capacitance being a function of a proximity of a dielectric mass to the capacitive touch element;

periodically sampling a decreased magnitude, phase-shifted version of the sum appearing across one of the capacitive touch element or the resistor according to first and second sampling periodicities, the first and second sampling periodicities being associated with the input periodic voltage waveforms of frequencies F1 and F2, respectively;

performing discrete Fourier transform ("DFT") operations on a set of numerical magnitude values sampled according to the first and second sampling periodicities, from at least a portion of a cycle of the decreased magnitude, phase-shifted version of the sum;

generating a real numerical output value and an imaginary numerical output value from the DFT operations for each set of numerical magnitude sample values;

determining phase shifts, where each of the phase shifts corresponds to a phase shift between a respective one of the periodic voltage waveforms of frequencies F1 and F2 and a decreased magnitude, phase-shifted version of the respective one of the periodic voltage waveforms of frequencies F1 and F2; and determining potential values of the variable capacitance corresponding to the phase shifts between the periodic voltage waveforms of frequencies F1 and F2 and the corresponding decreased magnitude, phase-shifted version of the periodic voltage waveforms of based on one or more of the following equations:

$$C\_TOUCH(\phi\_DIFF\_F1)=(\tan \phi\_DIFF\_F1)/(2*\pi*F1*R), \text{ and}$$

$$C\_TOUCH(\phi\_DIFF\_F2)=(\tan \phi\_DIFF\_F2)/(2*\pi*F2*R),$$

where C_TOUCH($\phi$_DIFF_F1) and C_TOUCH ($\phi$_DIFF_F1) represent potential values of the variable capacitance of the capacitive touch element calculated based on $\phi$_DIFF_F1 and $\phi$_DIFF_F2, respectively, where $\phi$_DIFF_F1 and $\phi$_DIFF_F2 represent phase shifts determined between the periodic voltage waveforms of frequencies F1 and F2, respectively, and decreased magnitude, phase-shifted versions of the periodic voltage waveforms of frequencies F1 and F2, respectively, and R represents a resistance of the resistor.

17. The method of capacitive touch detection of claim 16, further comprising:

determining an output phase value ("$\phi$_OUTPUT_F1", "$\phi$_OUTPUT_F2") associated with a corresponding decreased magnitude, phase-shifted version of the periodic voltage waveform of frequency F1, F2 based on one or more of the following equations:

$$\phi\_OUTPUT\_F1=\arctan 2(I\_OUT\_F1,Q\_OUT\_F1),$$
and $$\phi\_OUTPUT\_F2=\arctan 2(I\_OUT\_F2,Q\_OUT\_F2),$$

where $\phi$_OUTPUT_F1 and $\phi$_OUTPUT_F2 represent output phase values for decreased magnitude, phase-shifted versions of the periodic voltage waveforms of frequencies F1 and F2, respectively, where I_OUT_F1 and I_OUT_F2 represent real numerical output values generated by respective DFT logic modules, and where Q_OUT_F1 and Q_OUT_F2 represent imaginary numerical output values generated by respective DFT logic modules; and calculating the phase shift based on one or more of the following equations:

$$\phi\_DIFF\_F1=(\phi\_OUTPUT\_F1)-(\phi\_INPUT\_F1), \text{ and}$$

$$\phi\_DIFF\_F2=(\phi\_OUTPUT\_F2)-(\phi\_INPUT\_F2), \text{ and}$$

where $\phi$_DIFF_F1 and $\phi$_DIFF_F2 represent phase shifts determined between periodic voltage waveforms of frequencies F1 and F2, respectively, and the decreased magnitude, phase-shifted version of the periodic voltage waveforms of frequencies F1 and F2, respectively, where $\phi$_OUTPUT_F1 and $\phi$_OUTPUT_F2 represent output phase values for decreased magnitude, phase-shifted versions of the periodic voltage waveforms of frequencies F1 and F2, respectively, and where $\phi$_INPUT_F1 and $\phi$_INPUT_F2 represent phase values associated with periodic voltage waveforms of frequencies F1 and F2, respectively.

18. The method of capacitive touch detection of claim 16, further comprising:

determining an output amplitude value associated with a corresponding decreased magnitude, phase-shifted version of the periodic voltage waveform based on one or more of the following equations:

$$A\_OUTPUT\_F1=\text{sqrt}[(I\_OUT\_F1)2+(Q\_OUT\_F1)2], \text{ and}$$

$$A\_OUTPUT\_F2=\text{sqrt}[(I\_OUT\_F2)2+(Q\_OUT\_F2)2],$$

where A_OUTPUT_F1 and A_OUTPUT_F2 represent output amplitude values for decreased magnitude, phase-shifted versions of the periodic voltage waveforms of frequencies F1 and F2, where I_OUT_F1 and I_OUT_F2 represent real numerical output values generated by respective DFT logic modules, and where Q_OUT_F1 and Q_OUT_F2 represent imaginary numerical output values generated by respective DFT logic modules;

determining an amplitude ratio of the corresponding decreased magnitude, phase-shifted version of the periodic voltage waveform to the periodic voltage waveform as based on one or more of the following equations:

$$AR\_F1=A\_OUTPUT\_F1/A\_INPUT\_F1,$$

$$AR\_F2=A\_OUTPUT\_F2/A\_INPUT\_F2$$

where AR_F1 and AR_F2 represent amplitude ratios of decreased magnitude, phase-shifted versions of the periodic voltage waveforms of frequency F1 and F2, respectively, to the periodic voltage waveforms of frequencies F1 and F2, respectively, where A_OUTPUT_F1 and A_OUTPUT_F2 represent output amplitude values for respective decreased magnitude, phase-shifted versions of the periodic voltage waveforms of frequencies F1 and F2, respectively, and where A_INPUT_F1 and A_INPUT_F2 represent constant input amplitude values associated with corresponding periodic voltage waveforms of frequencies F1 and F2, respectively; and determining potential values of the variable capacitance corresponding to amplitude ratios of the decreased magnitude, phase-shifted versions of the periodic voltage waveforms of frequencies F1 and F2 to the periodic voltage waveform of frequencies F1 and F2, respectively, based on one or more of the following equations:

$$C\_TOUCH(AR\_F1) = [(1-AR\_F1^{}2)]^{}1/2/(2^*\pi^*F1^*R^*AR\_F1),$$

$$C\_TOUCH(AR\_F2) = [(1-AR\_F2^{}2)]^{}1/2/(2^*\pi^*F2^*R^*AR\_F2),$$

where C_TOUCH(AR_F1) and C_TOUCH(AR_F2) represent potential values of the variable capacitance of the capacitive touch element determined based on AR_F1, and AR_F2, respectively, where AR_F1 and AR_F2 represent ratios of the decreased magnitude, phase-shifted versions of the periodic voltage waveforms associated with corresponding DFT logic modules to the periodic voltage waveforms associated with corresponding DFT logic module, where F1 and F2 correspond to frequencies, and R represents a resistance of the resistor.

19. The method of capacitive touch detection of claim 18, further comprising:

comparing at least two of the potential values of the variable capacitance to determine whether a difference between the potential values of the variable capacitance is greater than a selected value;

generating a numerical average of the potential values of the variable capacitance as an output value if the difference between the potential values of the variable capacitance is not greater than the selected value; and generating an invalidity flag if the difference between the potential values of the variable capacitance is greater than the selected value.

20. The method of capacitive touch detection of claim 18, further comprising:

performing weighted averaging operations on the potential values of the variable capacitance; and generating a weighted average of the potential values of the variable capacitance as an output value.

* * * * *